United States Patent [19]

Greer

[11] Patent Number: 4,756,359

[45] Date of Patent: Jul. 12, 1988

[54] AUXILIARY AIR CONDITIONING, HEATING AND ENGINE WARMING SYSTEM FOR VEHICLES

[75] Inventor: J. Rex Greer, Lubbock, Tex.

[73] Assignee: Pony Pack, Inc., Fort Sumner, N. Mex.

[21] Appl. No.: 45,472

[22] Filed: May 4, 1987

Related U.S. Application Data

[63] Continuation-in-part of Ser. No. 869,607, Jun. 2, 1986, Pat. No. 4,682,649.

[51] Int. Cl.$^4$ ............... F02N 17/06; B60H 1/22; B60H 1/32
[52] U.S. Cl. ............... 165/43; 62/236; 122/26; 123/142.5 R; 237/12.3 B; 237/12.3 C; 237/12.1
[58] Field of Search ............... 123/142.5 R; 165/42, 165/43; 62/236; 122/26; 237/12.3 B, 12.3 C, 12.1

[56] References Cited

U.S. PATENT DOCUMENTS

| | | | |
|---|---|---|---|
| 3,866,433 | 2/1975 | Krug | 62/236 |
| 4,264,826 | 4/1981 | Ullmann | 122/26 |
| 4,448,157 | 5/1984 | Eckstein | 123/142.5 R |
| 4,531,379 | 7/1985 | Diefenthaler, Jr. | 237/12.3 B |
| 4,611,466 | 9/1986 | Keedy | 123/142.5 R |

Primary Examiner—Albert W. Davis, Jr.
Attorney, Agent, or Firm—Brady, O'Boyle & Gates

[57] ABSTRACT

A small lightweight auxiliary power plant including an engine, electrical alternator, water pump, air conditioning compressor and a heat exchanger is mounted at a convenient location on the tractor of a truck or other large vehicle. The main engine of the truck operates the existing truck air conditioning and heating system in a normal manner when the main engine is running. When the main engine of the truck is not operating and the smaller engine of the auxiliary power plant is operating, the truck air conditioning and heating system is operated by the auxiliary power plant. The heat exchanger of the auxiliary power plant then utilizes the heat of exhaust gases generated by the auxiliary power plant engine to warm the truck engine during the time it is not operating so that easy starting of the truck engine is made possible even in very cold weather. The exhaust gases from the auxiliary engine are also utilized to heat the lubricating oil of the main engine. When desired, an external load is applied to the crank shaft of the auxiliary engine to increase the heat output generated by the auxiliary engine.

23 Claims, 5 Drawing Sheets

AUXILIARY AIR CONDITIONING, HEATING AND ENGINE WARMING SYSTEM FOR VEHICLES

CROSS REFERENCE TO RELATED APPLICATION

This is a continuation-in-part application of U.S. Ser. No. 06/869,607 entitled "Auxiliary Air Conditioning Heating And Engine Warming System For Trucks", filed in the name of J. Rex Greer, on Jun. 2, 1986 now U.S. Pat. No. 4,682,649 granted Jul. 28, 1987.

BACKGROUND OF THE INVENTION

1. Technical Field

This invention relates to air conditioning and heating systems for trucks or other large vehicles, and more particularly relates to an auxiliary power plant which is connected to and operates in conjunction with the existing air conditioning and heating system of the vehicle and also serves to warm the engine of the vehicle to enable easy starting of the vehicle engine in cold weather.

2. Description of the Prior Art

Auxiliary systems are known in the prior art for heating a vehicle engine and its fuel line while the engine is not operating. Examples of such prior art are present in U.S. Pat. Nos. 3,877,639, 4,192,457 and 4,448,157.

U.S. Pat. No. 4,454,984 discloses an auxiliary system for heating a truck cab in which the truck storage batteries operate an auxiliary pump.

U.S. Pat. No. 4,531,379 discloses an auxiliary power system for a vehicle air conditioner and heater. The system is designed for an automobile or van. It utilizes a jack shaft assembly equipped with an electromagnetic clutch to transfer power from an auxiliary engine to an existing air compressor of the vehicle when the main engine of the vehicle is not operating.

U.S. Pat. No. 4,448,157 discloses a system including an auxiliary engine for heating the coolant of the main engine, when not in use; however, the disclosed system exhibits several limitations. For example, it teaches the placement of a shut down regulator before the coolant is heated by the heat exchanger. This will cause the auxiliary engine to be overheated long before the shut-down regulator operates. Also the use of T connectors into the radiator outlet, rather than into the engine itself, will only heat the radiator as the non-restricted flow into and out of the radiator will offer less resistance than the thermostatic restriction into and out of the engine itself. As is well known, the thermostat in the engine return line to the radiator closes to stop water flow out of the engine until proper temperature is reached and this will prevent the system from heating the engine as the flow will only be in and out of the unrestricted radiator connections. The coolant also goes through an auxiliary cooling radiator before going back to the main engine. This radiator appears to reduce the heat supply even more.

The objective of the present invention is to improve on the known prior art through provision of an auxiliary power plant for trucks or other large vehicles which is operatively connected with the existing air conditioning and heating system of the vehicle in such a way that the auxiliary power plant can efficiently operate the air conditioning and heating system of the vehicle during such times when the engine of the vehicle is not operating. To enable this, the auxiliary power plant possesses its own engine, alternator, air conditioning compressor, water pump and a heat exchanger which includes heating coils connected in the water cooling circuit of the main engine and being in heat exchange relationship with the exhaust system of the engine of the auxiliary plant.

A further important object of the invention is to provide in an auxiliary power plant of the type mentioned, means for warming the main engine of the truck or other large vehicle when such main engine is not operating, to thereby render easy the starting of the main engine in cold weather after long periods of idleness.

Still a further important object of the invention is to provide in an auxiliary power plant of the type mentioned means for heating the cab of the truck or other large vehicle when the main engine is not running.

Yet a further important object of the invention is to provide in an auxiliary power plant of the type mentioned, means for heating the oil of the truck or other large vehicle when the main engine is not running in order to facilitate the starting thereof.

Another important object of the invention is to provide in an auxiliary power plant of the type mentioned means for applying additional load to the auxiliary engine for increasing the heat output thereof when desired.

Yet another important object of the invention is to provide an auxiliary power plant whose dimensions do not exceed approximately 18"×18"×24" and whose weight including its frame does not exceed approximately 200 pounds, thus enabling the power plant to be installed conveniently at available locations on different makes and models of trucks.

Other features and advantages of the invention will become apparent to those skilled in the art during the course of the following description.

As used herein, the word "truck" is not to be taken in a limiting sense, and is intended to apply to any large vehicle, such as a bus, road building equipment, or a military vehicle.

DETAILED DESCRIPTION

Figure 1:
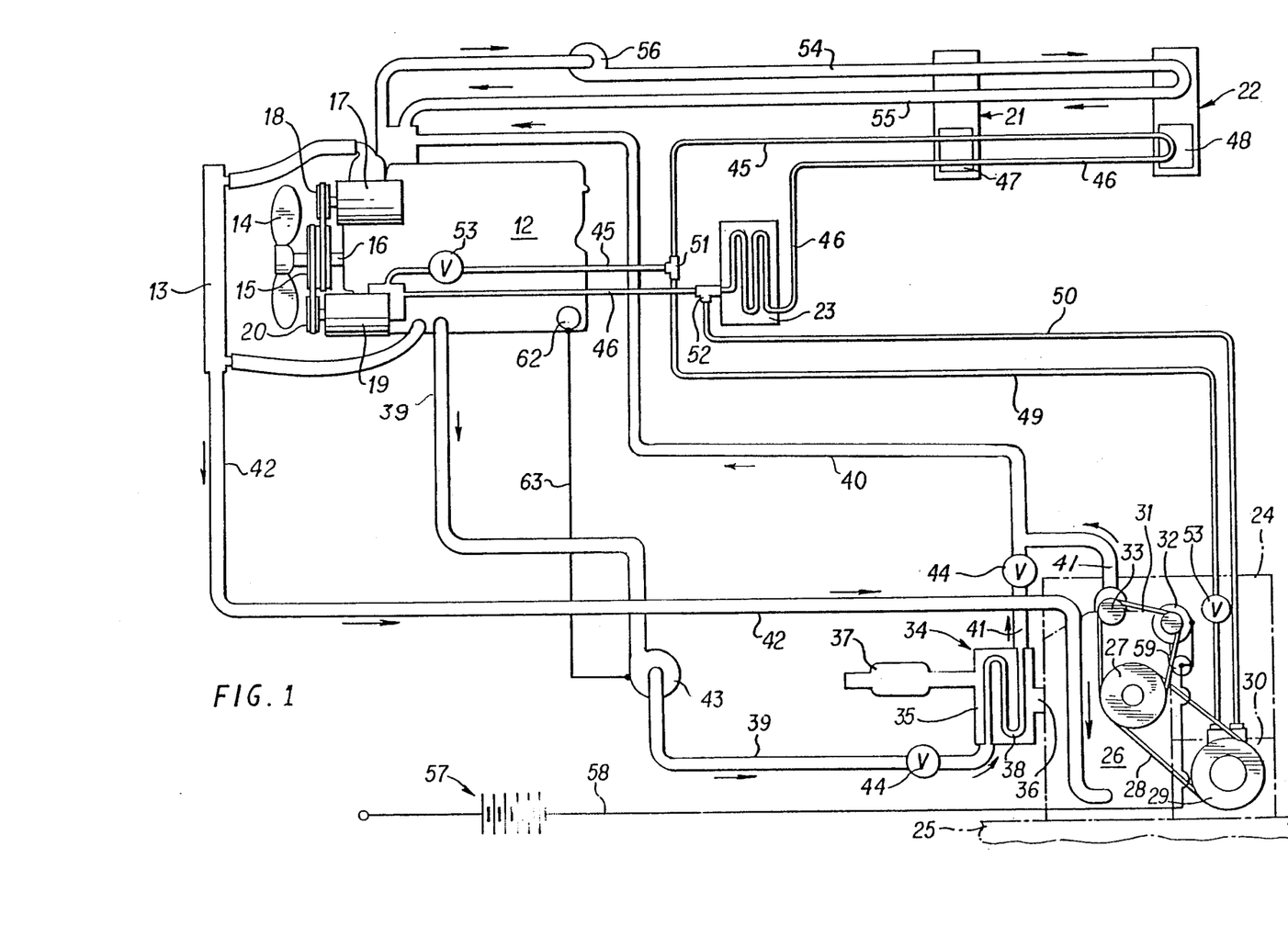
FIG. 1 is a schematic side elevation of an embodiment of a truck air conditioning and heating system and an auxiliary power plant for such system according to the referenced related application.
Figure 2:
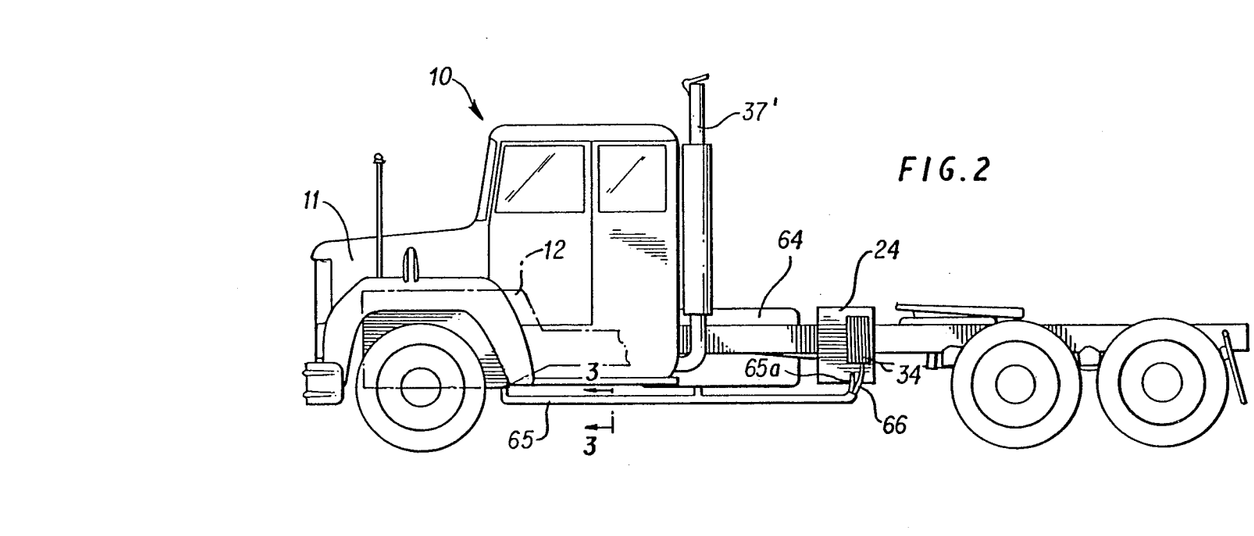
FIG. 2 is a side elevation of a truck tractor having the invention applied thereto.

Referring to the drawings in detail wherein like numerals designate like parts, FIG. 2 discloses a conventional semi-trailer truck including a tractor 10 having a compartment 11 for the truck engine 12, such as a diesel engine. The truck engine is equipped with a radiator 13, as shown in FIG. 1, behind which is located the usual fan 14 driven by a pulley means 15 on the engine crank shaft 16. A truck alternator 17 is operated by a drive belt and pulley 18 driven by the pulley means 15. Similarly a truck air conditioning compressor 19 is operated by a belt and pulley 20 driven by the pulley means 15.

The truck cab 10' is equipped with a dash-mounted conventional ac/heater unit 21, and a separate ac/heater unit 22 is provided in the sleeping compartment of the truck tractor. The truck air conditioning condenser 23 may be grill or roof mounted, as found desirable. When grill mounted, an electric temperature controlled fan, not shown, is added to cool the condenser while the vehicle is stationary, or the truck engine fan 14 can be replaced by a full electric fan.

An auxiliary power plant 24 forming the principal subject matter of the invention includes a suitable supporting and unitizing frame 25, and may be mounted at any convenient location on the truck tractor, such as behind the cab on the tractor means frame, or in the location of the customary cab step.

The auxiliary power plant 24 comprises a small engine 26 such as a Kubota diesel engine or an equivalent engine. The engine 26 drives a crank shaft pulley 27, connected through a belt 28 with a pulley 29 of the power plant compressor 30. Another belt 31 driven by the crank shaft pulley 27 drives a power plant alternator 32, and also drives a power plant water pump 33.

A power plant heat exchanger 34 includes a chamber 35 receiving hot exhaust gases from an exhaust port 36 of the power plant engine 26. From the chamber 35, the spent exhaust gases pass to a muffler 37, which, for added safety, is preferably connected into the customary vertical exhaust stack 37' of the truck tractor 10, FIG. 2.

Within the chamber 35, the heat exchanger 34 includes heat exchanger coils 38 preferably formed of copper and being of any thermally efficient shape, such as wide, flat, thin coils.

A preferably insulated conduit 39 leads from the water jacket at the bottom of the truck engine 12 to the inlet end of the heat exchanger coil 38 and another insulated conduit 40 leads from the outlet end of the heat exchanger coil back to the water jacket at the top of truck engine 12. A branch conduit 41 interconnects the power plant water pump 33 with the water return conduit 40. Another preferably insulated conduit 42 leads from the truck radiator 13 to the water jacket of the power plant engine 26.

A water circulating pump 43 is connected in the conduit 39 and pulls water from one side of the truck engine 12, pumping it through the power plant heat exchanger coil 38 and back through the conduit 40 to the other side of the truck engine.

One-way check valves 44 are installed in the conduits 39 and 40 near the opposite ends of the heat exchanger coil 38. When the circulating pump 43 is off, the check valves 44 allow the heat exchanger 34 to boil dry, thereby stopping the heat transfer process by preventing any back-flow of water through the lines 40 and 39.

Air conditioning pressure lines 45 and 56 lead from the truck compressor 19 serially through the truck cab and sleeper compartment ac units 47 and 48, each having their own controls, and from these units back to the truck compressor 19. The return refrigerant line 46 has the condenser 23 connected therein immediately before the T-fitting 52 also connected with the return refrigerant line 50.

Auxiliary air conditioning pressure lines 49 and 50 lead from and to the power plant compressor 30 and are connected by T-fittings 51 and 52 with the truck air conditioning pressure lines 45 and 46, respectively. Cut-off valves 53 are placed in the lines 45 and 49 leading from the two compressors 19 and 30. Automatic pressure-actuated one-way cut-off valves are preferred, although electric valves or even manual valves can be used to assure the flow of freon in one direction only. The valves 53 are critical to the operation of the system having the two compressors 19 and 30.

Existing truck heater hoses 54 and 55 extend to and from the truck engine water cooling system and pass serially through the truck cab dash-mounted and sleeper compartment heater units having their own heater controls, as shown. A circulating pump 56 is connected in the heater hose 54, with a control switch on the power plant panel, not shown, which control panel can be located at any convenient point on the truck. The power plant control panel is wired into the truck electrical system so that the power plant alternator 32 charges the existing truck storage batteries 57, which are the only batteries employed in the entire system. When the truck engine 12 is not operating, the power plant alternator 32 operates the total electrical system embodied in the invention.

A cable 58 interconnects the truck storage batteries with the starter 59 of the power plant engine 26. The starter is conventional. A temperature-responsive on-off switch 62 of the type commonly used for fans is provided for the control of circulating pump 43 and is connected therewith by a conductor 63. The switch 62 is in thermal contact with the truck engine 12. In lieu of the thermal switch 62, a manual on-off switch could be used to turn off the circulating pump 43 when the desired temperature of the truck engine 12 is reached while such engine is not running.

When the truck engine 12 is running, as when the truck is traveling or stopped for a short time period only, the truck air conditioning and heating systems operate in a conventional manner to supply conditioned air or warm air to the truck cab and/or sleeping compartment through the individually controllable units 21 and 22. At this time, the auxiliary power plant including its small engine 26 is inactive and has no effect on the operation of the truck air conditioning and heating systems or its electrical system.

When the truck stops for a lengthy period and its engine 12 is shut off, the operation of the truck alternator 17 and compressor 29 of course ceases. At this time, the auxiliary power plant 24 is activated by starting its relatively small engine 26, which activates the alternator 32, water pump 33 and the compressor 30 whenever air conditioning of the truck cab and/or sleeping compartment is demanded. When it is demanded, the connections of the pressurized freon lines 49 and 50 through the T-fittings 51 and 52 will supply air conditioning in the same manner that it would ordinarily be supplied by the truck system including the compressor 19.

Simultaneously, the circulating pump 43 constantly draws water from the truck engine water cooling system and pumps it through the coil 38 of the power plant heat exchanger 34 and back to the truck engine, whereby proper heating of the cab and/or sleeping compartment is made available on demand even though the truck engine is not operating.

The heat of the exhaust gases from the power plant engine 26 is utilized to heat the water flowing through the heat exchanger coil 38 in continuous and efficient manner as long as the small engine 26 operates.

Additionally, the heated water flowing to and from the water jacket of the truck engine 12 through the insulated conduits 40 and 39 respectively maintains the truck engine warm so that it will start quickly even in very cold weather. This added capability of the invention for warming the truck engine while making available cab and sleeping compartment heating and air conditioning is a very important feature not heretofore available in the prior art. The provision of the additional circulating pump 56 in the existing truck heater conduit system renders the operation of the invention even more efficient. The cut-off valves 53 in the freon pressure lines 45 and 59 are essential to the proper operation of the air conditioning system in accordance with the invention.

It may now be seen that the invention is characterized by convenience and simplicity of construction and operation. Existing components on the truck or other large vehicle are used in the normal manner while the truck engine 12 is operating. When the truck engine is not operating and the auxiliary power plant 24 is in use, existing components of the truck heating and air conditioning system are still employed and therefore complete duplication of system parts is avoided. Only such parts as are essential to the proper functioning of the truck heating and air conditioning system, and essential to maintaining the truck engine warm while shut off for long periods, are included in the auxiliary power plant 24. These essential components are the small engine 26, alternator 32, compressor 30, heat exchanger 34 and the water pump 33. Throughout the system embodying the invention, conventional commercial shelf components are used almost entirely. The heat exchanger 34 is basically the only customized component of the invention, and the heat exchanger is quite simplified in construction.

As shown in FIG. 2, the auxiliary power plant 24, in many cases, can be mounted on the main frame of the tractor 10 behind its fuel tanks 64. The exact location of the power plant 24 will depend on the style or configuration of the particular truck or other large vehicle to which the invention is applied. Because of its lightness and compactness, the auxiliary power plant 24 can easily be installed on practically any large vehicle whether a truck, bus, military vehicle or road building machine.

A desirable optional feature of the invention where use is contemplated in extremely cold conditions consists of providing a convenient and economical means of warming the fuel lines 65 and 65a extending from the fuel tank or tanks 64 to the truck engine 12 or auxiliary power plant engine 26. This means preferably comprises the provision of a hot water line 66, FIG. 3, extending to or from the heat exchanger 34, FIG. 2, and being placed in thermal contact with the fuel lines 65 and 65a, both lines being jacketed with insulation 67. This arrangement is fully effective in preventing gelling of the diesel fuel even in extremely cold weather. All of the necessary heat is provided by the exhaust of the small engine 26. This heat is more than adequate to warm the truck engine 12 while simultaneously warming the lines feeding fuel to both engines 12 and 26.

Figure 3:
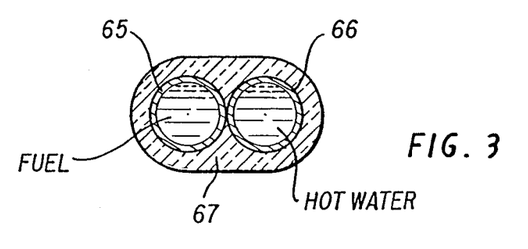
FIG. 3 is an enlarged vertical section taken on line 3—3 of FIG. 2.

Since the fuel lines 65 and 65a are connected with the fuel tank 64 at or near its bottom, there is almost never a problem with gelling of fuel in the tank. However, if desired, some external insulation can be provided on the bottom of the tank 64.

Figure 4:
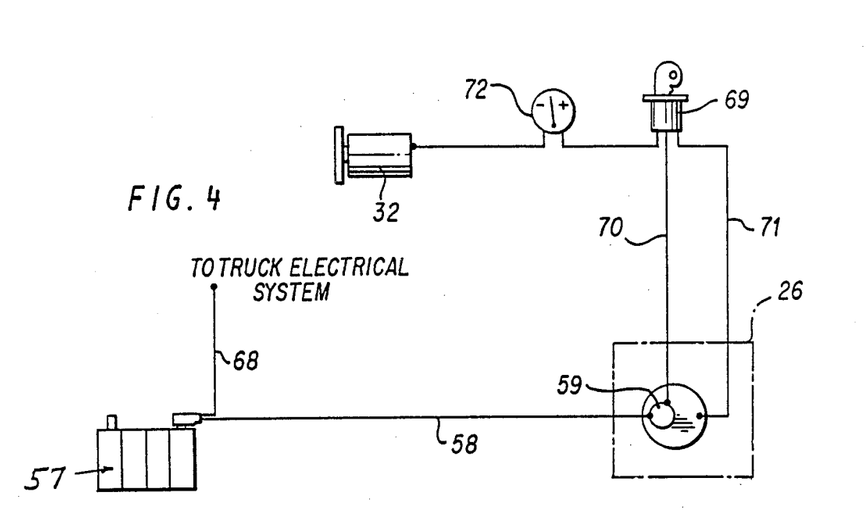
FIG. 4 is a partial schematic view of the truck ignition system as involved in the present system.

Referring to FIG. 4, the truck storage battery means 57 and battery cable 58 leading to the solenoid of the starter 59 for the power plant engine 26 is indicated. Another cable 68 interconnects the storage battery means 57 to the conventional electrical system of the truck, which system need not be illustrated in detail. The conventional truck ignition switch 69 has one terminal thereof connected with a conductor 70 leading to the starter solenoid 59 of power plant engine 26, the conductor 70 being the hot conductor. Another terminal of the ignition switch 69 is connected with a power plant engine starter wire 71. A third terminal of the switch 69 interconnects that switch with the power plant alternator 32 through a conventional ammeter 72.

Figure 5:
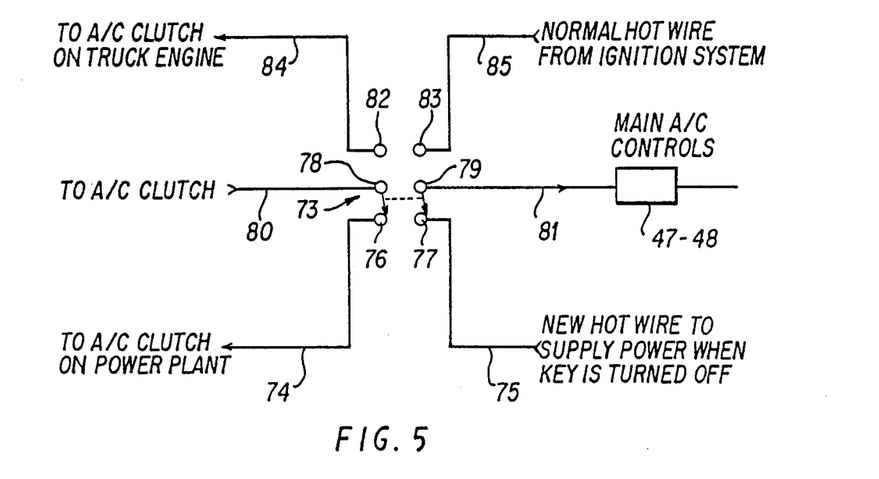
FIG. 5 is a schematic view showing terminals of a dash mounted switch and associated elements.

A dash-mounted, double pole, double throw (DPDT) switch 73, FIG. 5, separate from the truck ignition switch 69 is provided. Conductors 74 and 75 extend from terminals 76 and 77 of the switch 73, respectively, to the electric clutch of the power plant air conditioning compressor 30 and form a new hot wire to supply power when the truck ignition key is turned off.

Terminals 78 and 79 of the switch 73 are connected through conductors 80 and 81 to the electric clutch of truck compressor 19 and to the controls of the truck air conditioning units 47 and 48. Terminals 82 and 83 of the switch 73 are connected, respectively, to a conductor 84 leading to the clutch of truck compressor 19, and to a conductor 85 which is the normal hot wire from the truck ignition system to the switch 73.

Up to this point what has been shown and described are the features disclosed in the above referenced related patent application of which this invention is a continuation in part.

Figure 6:
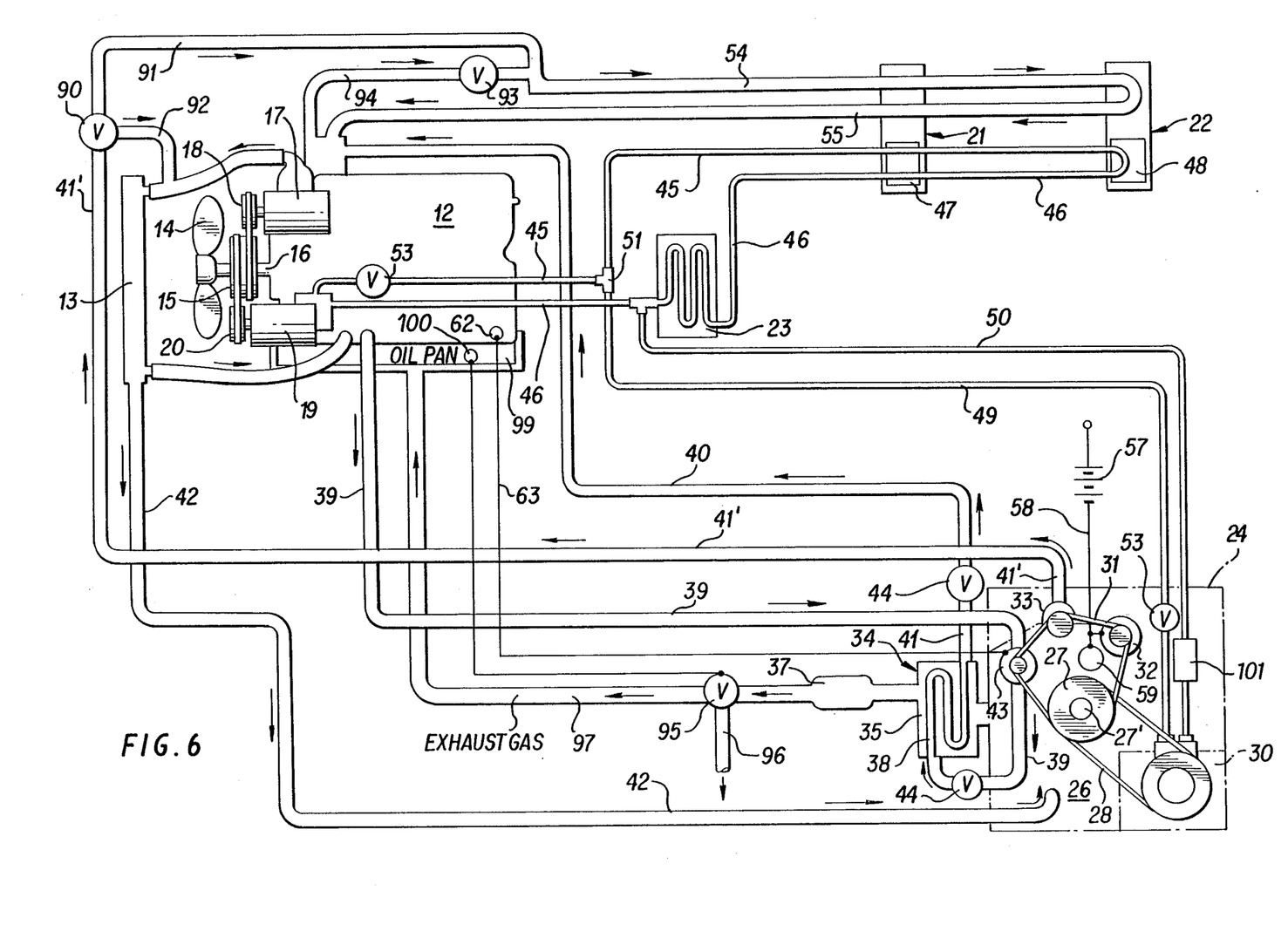
FIG. 6 is a schematic side elevation of an embodiment of a truck air conditioning and heating system and an auxiliary power plant for such system according to the present invention.

Referring now to FIG. 6, there is shown a configuration which is similar to that shown in FIG. 1 but differs therefrom in a manner now to be explained. First of all, the circulating pump 43 coupled to the conduit 39 between the heat exchanger coil 38 and the water jacket of the truck engine 12 comprises a circulator pump 43' which is mounted on the auxiliary engine 26 and driven by the belt 31 on the crank shaft pulley 27, which as shown also drives the power plant alternator 32 and the power plant water pump 33. One of the check valves 44 is still located between the circulating pump 43' and the heat exchanger 38. The flow through the circulating pump 43' is also thermostatically controlled by the temperature responsive on/off switch 62 located on the main engine 12, it being connected thereto by the conductor 63 as before. Heated counter/coolant provided by way of the heat exchanger 38 is delivered to the top of the main engine 12 by way of conduit 40 with the return flow to the auxiliary engine being from the bottom of the engine 12 via conduit 39.

Whereas conduit 41 of FIG. 1 interconnects the power plant water pump 33 with the return conduit 40 to provide a double source of heated coolant to the water jacket of the main engine 12, the embodiment of FIG. 6 includes a conduit 41' which now supplies heated coolant from the power plant water pump 33 either to the cab heater supply line 54 or to the top of the radiator 13. This is provided by means of a two way valve 90 having output conduit lines 91 and 92 respectively coupled to conduit 54 and top of the radiator 13 respectively. The conduit 91, moreover, is coupled to the conduit 54 on the other side of a one way check valve 93. The check valve prevents back flow into conduit 94. This permits directing coolant or water flow either into the cab heater unit 21 or back into the top of the main engine radiator 13 depending on the requirement for heat into the cab 10' (FIG. 2). This now permits coolant heat from the auxiliary engine 26 to be used to directly heat the cab 10' (FIG. 2). Where this type of cab heating is not required, one manually activates valve 90 so that the heated coolant in conduit 41' flows into conduit 92 and into the top of the radiator. In such a case, heated coolant entering the main engine 12 by conduit 40 can be coupled to the cab heater supply line 54 by way of the conduit 94 in the same manner as shown with respect to FIG. 1.

The embodiment shown in FIG. 6 additionally contemplates using the exhaust heat from the auxiliary engine 26 to heat the lubricating oil of the main engine 12. This is provided by a thermostatically controlled two way gas valve 95 connected to the output of the muffler 37. The valve 95 includes two output ports which are respectively connected to the exhaust pipes 96 and 97. The exhaust 96 comprises a conventional exhaust pipe which is adapted to discharge exhaust gases from the auxiliary engine 26 to the atmosphere. The exhaust pipe 97, on the other hand, is connected to a housing 98 which surrounds the oil pan 99 located on the underside of the main engine 12. A temperature controlled switch 100 is conveniently mounted on the oil pan 99 to activate the valve 95 when the temperature of the oil pan 99 is below a predetermined temperature which then causes the valve to direct exhaust gas from the muffler into the exhaust pipe 97 to heat the oil pan 99. When the temperature is above a predetermined temperature, the valve is caused to direct exhaust gas from the auxiliary engine 26 to the outside exhaust pipe 96. Thus the auxiliary engine 26 in addition to supplying heated water or coolant to the water jacket of the main engine and cab, also supplies hot exhaust gases which are utilized to preheat the oil of the main engine 12 to further enhance the main engine's starting capability in very cold weather.

The air conditioning system as previously disclosed in FIG. 1 remains the same with the exception that an accumulator tank 101 is shown coupled into the return refrigerant line 50 to prevent a full chamber of liquid entering the cylinder, not shown, of the compressor 30 which, as well known, can have catastrophic effects.

In addition to the features illustrated in FIG. 6, it is also an object of this invention to increase the heat output of the auxiliary engine 26, when necessary, to heat the water/coolant circulated internally through the auxiliary engine 26 as well as the heat exchanger 38 and to increase the heat of the exhaust gas and /oil in the main engine. This involves applying external loading to the auxiliary engine 26. Two schemes for accomplishing this result are shown in FIGS. 7 and 8.

Figure 7:
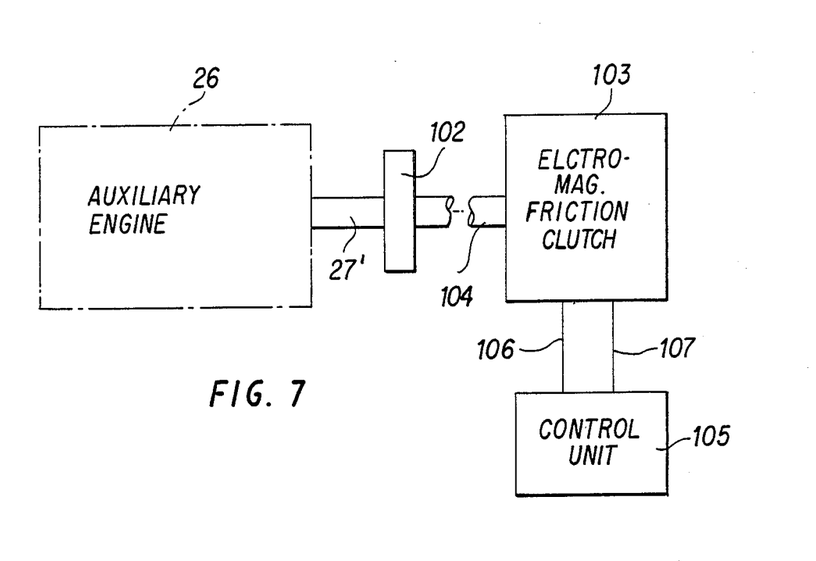
FIG. 7 is a fragmentary schematic rear elevation of the auxiliary power plant showing a first embodiment of means for applying additional load to the auxiliary engine.
Figure 8:
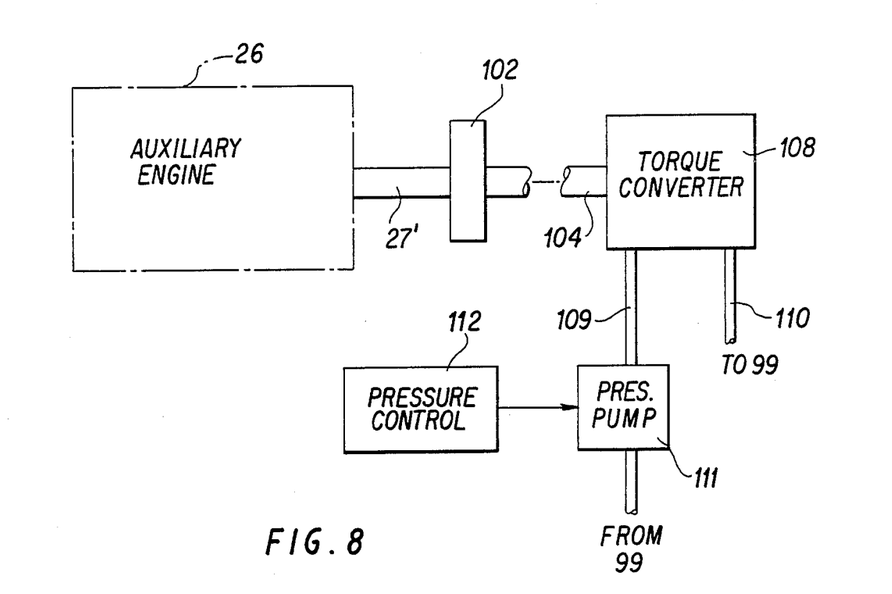
FIG. 8 is a fragmentary schematic rear elevation of the auxiliary power plant showing a second embodiment of means for applying additional load to the auxiliary engine.

Referring first to FIG. 7, the auxiliary engine 26 includes a crank shaft 27' to which is attached a fly wheel 102 in a conventional manner. In order to increase the heat output of the auxiliary engine, an external load in the form of an electromagnetic friction clutch device 103 having a shaft 104, is mechanically coupled to the crank shaft 27' of the auxiliary engine. A control unit 105 is electrically connected to the clutch 103, for example, by means of electrical conductors 106 and 107. The control unit 105 can be located at any convenient location, for example in the cab 10' (FIG. 2). The control unit 105 controls the amount of electrical power supplied to the clutch device 103 for varying the friction applied between one or more friction plates, not shown, included in the clutch mechanism. By increasing the friction between the plates of the clutch 103, the heat generated by the auxiliary engine increases accordingly and thus is capable of transferring more heat back to the main engine 12.

While the configuration shown in FIG. 7 is relatively simple to implement, a second example of means for applying an external load to the auxiliary engine 26 comprises the mechanical coupling of a torque converter 108, having a rotational shaft 109, to the crank shaft 27'. The torque converter 108, moreover, includes a pair of oil lines 109 and 110 which are connected back to the oil pan 99 shown in FIG. 6. The torque converter 108 also includes a set of drag fins, not shown, whose orientation can be varied by the pressure of the oil supplied thereto through a pressure pump 110 having an external control means 112. Increasing the drag increases the loading on the auxiliary engine as before. The oil being returned to the main engine 12 from the torque converter 108 will be furthermore heated, further aiding the preheating of the oil supply in the main engine 12 to aid in starting of the engine in cold weather.

Having thus shown and described what is at present considered to be the preferred embodiments of the invention, it should be noted that the same has been made by way of illustration and not limitation. Accordingly, all modifications, alterations and changes coming within the spirit and scope of the invention as set forth in as the following claims are herein meant to be included.

I claim:

1. A heating and engine warming system for vehicles, particularly trucks and like vehicles comprising:
    an engine including a block connected to a radiator;
    an engine and vehicle compartment heating system including heater conduits extending from the engine block to at least one heating unit located in a compartment of the vehicle and extending back to the engine block;
    an auxiliary power plant on the vehicle including an auxiliary engine having a water pump driven by the auxiliary engine and a heat exchanger having a chamber located immediately adjacent the auxiliary engine for receiving hot exhaust gases therefrom and having a liquid heating coil within said chamber in heat transfer relationship with the exhaust gases;
    first and second coolant conduits coupling opposite ends of the heating coil of the heat exchanger to the engine block for circulating coolant heated by the auxiliary engine therethrough;
    a circulating pump connected in the first conduit between the engine block and the heating coil,
    the return of heated coolant to the engine block from said second conduit acting to warm the engine block and thus aid starting of the truck engine in cold weather when the auxiliary power plant is operated; and third and fourth coolant conduits, said third coolant conduit being coupled from said radiator to the coolant system of the auxiliary engine and through the water pump thereof, and said fourth coolant conduit having means for selectively coupling from said water pump back to said radiator or to said heating unit of said vehicle compartment, when the auxiliary power plant is operated.

2. The system as defined by claim 1 and additionally including selectively actuated valve means having an input port and two output ports, said input port being coupled to said fourth coolant conduit, one of said two output ports being coupled to said radiator and the other of said two output ports being coupled to said heating unit, and means in the heater conduit extending from the engine block to said at least one heating unit for preventing back flow into the engine block from said fourth coolant conduit.

3. The system as defined by claim 1 and including means coupled between said auxiliary engine and said engine for heating the lubricating oil of said engine by the heat generated by the auxiliary engine when the auxiliary power plant is operated.

4. The system as defined by claim 3 wherein said engine includes an oil pan containing engine lubricating oil and wherein said means for heating said lubricating oil includes means for coupling the hot exhaust gases from the auxiliary engine to said oil pan.

5. The system as defined by claim 4 wherein said exhaust gas coupling means includes valve means for coupling said exhaust gases either to said oil pan or to the outside atmosphere.

6. The system as defined by claim 5 wherein said valve means comprises a thermostatically controlled valve responsive to the temperature of said lubricating oil for coupling said exhaust gases to the outside atmosphere when the lubricating oil of said engine reaches a predetermined temperature.

7. The system as defined by claim 1 and additionally including means for applying an additional load on said auxiliary engine to increase the heat transferred to said heat exchanger.

8. The system as defined by claim 7 wherein said auxiliary engine includes a crank shaft and wherein said means for applying an additional load comprises an external load coupled to said crank shaft.

9. The system as defined by claim 8 wherein said external load comprises a mechanical load.

10. The system as defined by claim 8 wherein said external load comprises a variable friction device.

11. The system as defined by claim 8 wherein said external load comprises torque converter apparatus.

12. An air conditioning heating and engine warming system for vehicles, particularly trucks and other heavy vehicles, comprising:
an engine including a block connected to a radiator;
an engine and a vehicle compartment air conditioning and heating system including a compressor, a condenser, refrigerant lines extending from the compressor to at least one air conditioning unit and extending from the air conditioning unit to the condenser and back to the compressor and heater conduits extending from the engine block to at least one heating unit in said compartment and extending back to the engine block;
an auxiliary power plant on the vehicle including an auxiliary engine and coolant system having a water pump driven by the auxiliary engine and a heat exchanger having a chamber located immediately adjacent the auxiliary engine for receiving hot exhaust gases therefrom and having a liquid heating coil within said chamber in heat transfer relationship with the exhaust gases,
a first coolant conduit coupled from the engine block to one side of the heating coil of the heat exchanger and a second coolant conduit coupled directly back to the engine block, said second coolant conduit being additionally coupled to the other side of said heating coil,
a circulating pump connected in the first conduit between the engine block and the heating coil;
the return of heated coolant to the engine block from said second conduit acting to warm the engine block and thus aid starting of the truck engine in cold weather when the auxiliary power plant is operated; and
third and fourth coolant conduits, said third coolant conduit being coupled from said radiator to the coolant system of the auxiliary engine and through the water pump thereof, and said fourth coolant conduit having means for selectively coupling from said water pump back of the auxiliary engine to said radiator or to said heating unit of said vehicle compartment, when the auxiliary power plant is operated.

13. The system as defined by claim 12 and additionally including means in the heater conduit extending from the engine block to said heating unit for preventing back flow thereto from said fourth coolant conduit.

14. The system as defined by claim 13 wherein said means in the heater conduit comprises a one-way check valve.

15. The system as defined in claim 12 and additionally including means connected in said first and second cooling conduits on either side of the heating coil of said heat exchanger for allowing the heat exchanger to boil dry when the circulating pump is inactive.

16. The system as defined by claim 12, and additionally including first and second valve means coupled to opposite sides of said heating coil, said first valve means being further coupled in said first coolant conduit between the circulating pump and the heating coil, and said second valve means being coupled between the heating coil and said second coolant conduit, whereby the heat exchanger is boiled dry when the circulation pump is turned off.

17. The system as defined in claim 16, wherein said valve means comprise one-way check valves.

18. The system as defined by claim 12, wherein said auxiliary power plant further includes an air conditioning compressor driven by said auxiliary engine and refrigerant lines coupling the compressor of the auxiliary power plant to refrigerant lines connecting said air conditioning unit and said condenser, whereby refrigerant can be independently supplied to the vehicle compartment air conditioning system from the compressor of the auxiliary power plant when said auxiliary power plant is operated; and
means in the refrigerant lines between the vehicle compressor and said one air conditioning unit and between the compressor of the auxiliary power plant and said one air conditioning unit for restricting back flow of refrigerant therebetween.

19. The system as defined by claim 18, and additionally including means commonly connecting the refrigerant lines extending from and to the truck compressor and the refrigerant lines extending from and to the compressor of the auxiliary power to the refrigerant lines extending to and from said at least one air conditioning unit and condenser.

20. The system as defined by claim 18, wherein said means for restricting back flow of refrigerant comprises automatic pressure-actuated cut-off valve means.

21. The system as defined by claim 19 and additionally including an accumulator tank coupled in one line of said refrigerant lines coupled to the compressor of the auxiliary power plant for protecting the compressor from undesired overfill.

22. In an air conditioning and heating system as defined by claim 12, and additionally including a temperature responsive switch in thermal contact with the engine block and being electrically connected to said circulating pump for controlling activation of the pump to maintain the engine at a predetermined temperature when the truck engine is not running.

23. The system as defined by claim 12 wherein said first coolant conduit is coupled to the bottom of the engine block and wherein the second coolant conduit is coupled to the top of the engine block.

* * * * *